(12) United States Patent
Nakashima

(10) Patent No.: US 7,787,665 B2
(45) Date of Patent: Aug. 31, 2010

(54) IMAGE CAPTURING APPARATUS, PHOTOGRAPH QUANTITY MANAGEMENT METHOD, AND PHOTOGRAPH QUANTITY MANAGEMENT PROGRAM

(75) Inventor: Teruyoshi Nakashima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1076 days.

(21) Appl. No.: 11/482,828

(22) Filed: Jul. 10, 2006

(65) Prior Publication Data

US 2007/0019083 A1 Jan. 25, 2007

(30) Foreign Application Priority Data

Jul. 11, 2005 (JP) ............................. 2005-201994

(51) Int. Cl.
*G06K 9/00* (2006.01)
(52) U.S. Cl. ..................... 382/118; 382/103; 382/115; 348/207.99
(58) Field of Classification Search .... 348/207.99–376; 382/106, 115, 118
See application file for complete search history.

(56) References Cited

U.S. PATENT DOCUMENTS

| | | | | |
|---|---|---|---|---|
| 6,038,333 | A | * | 3/2000 | Wang .......................... 382/118 |
| 7,551,755 | B1 | * | 6/2009 | Steinberg et al. ............. 382/118 |
| 2002/0101519 | A1 | * | 8/2002 | Myers ......................... 348/232 |
| 2004/0008258 | A1 | | 1/2004 | Aas et al. |
| 2004/0207743 | A1 | * | 10/2004 | Nozaki et al. ........... 348/333.12 |
| 2004/0208114 | A1 | * | 10/2004 | Lao et al. .................... 369/125 |

FOREIGN PATENT DOCUMENTS

| JP | 2003-336952 A | 11/2003 |
|---|---|---|
| JP | 2004-62868 A | 2/2004 |
| JP | 2004-206113 A | 7/2004 |

OTHER PUBLICATIONS

Japanese Office Action issued on Apr. 21, 2010 in corresponding Japanese application No. 2005-201944 (with English translation).

* cited by examiner

*Primary Examiner*—Andrew W Johns
*Assistant Examiner*—Jason Heidemann
(74) *Attorney, Agent, or Firm*—Birch, Stewart, Kolasch & Birch, LLP

(57) ABSTRACT

An image capturing apparatus comprising:
an image capturing element which receives subject light incident via a photographing lens, converts the subject light into a captured image signal, and outputs the signal;
an A/D conversion section which converts the captured image signal outputted by the image capturing element into image data and outputs the image data;
a storage section which stores at least the image data outputted by the A/D conversion section;
a registration section which relates identification facial images which are image data to be used as criteria for identifying faces of subjects among the image data stored in the storage section to identification information of each subject, and registers related data into a database;
a facial image extraction section which extracts facial images which are facial portion regions of a person from photographed images which are desired image data outputted by the A/D conversion section and stored in the storage section;
an identification section which identifies from the database an identification facial image matching an extracted facial image which is a facial image extracted by the facial image extraction section;
and a photograph quantity calculation section which calculates for each subject identification information a photograph quantity which is the total number of photographed images from which an extracted facial image matching an identification facial image corresponding to identification information for each subject has been extracted.

19 Claims, 12 Drawing Sheets

FIG.5

BASIC INFORMATION REGISTRATION TABLE

| SUBJECT ID | NAME | REGISTERED FACIAL IMAGE |
|---|---|---|
| 1 | TARO FUJI | image001.jpg |
| 2 | HANAKO TAKAHASHI | image002.jpg |
| 3 | JIRO SUZUKI | image003.jpg |
| 4 | KAZUKO KATO | image004.jpg |
| 5 | SABURO YAMAMOTO | image005.jpg |
| ⋮ | ⋮ | ⋮ |

PHOTOGRAPHED IMAGE LIST TABLE ~75b

| IMAGE FILE NAME | SUBJECT ID | MAIN SUBJECT ID | FACE SIZE INAPPROPRIATE SUBJECT ID | EYES INAPPROPRIATE (HALF-OPEN) SUBJECT ID | EYES INAPPROPRIATE SUBJECT ID |
|---|---|---|---|---|---|
| DSC00001.jpg | 1,2,4,5,6 | 1 | 4 | - | 6 |
| DSC00002.jpg | 1,2,5,6,7,8 | 2 | 5 | 7 | 6 |
| .... | .... | .... | .... | .... | .... |

FIG.7

PHOTOGRAPH QUANTITY BY SUBJECT LIST TABLE ~75c

| SUBJECT ID | NAME | PHOTOGRAPH TARGET | PHOTOGRAPH QUANTITY | MAIN SHOT QUANTITY |
|---|---|---|---|---|
| 1 | TARO FUJI | ON | 5 | 2 |
| 2 | HANAKO TAKAHASHI | ON | 3 | 1 |
| 3 | JIRO SUZUKI | OFF | 0 | 0 |
| 4 | KAZUKO KATO | ON | 0 | 0 |
| 5 | SABURO YAMAMOTO | ON | 1 | 0 |
| .... | .... | .... | .... | .... |

FIG.8

| | | |
|---|---|---|
| FACE SIZE: | ☐ | % OR OVER |
| EYES: | ☐ | HALF-OPEN INVALID |
| LINE OF SIGHT: | ☐ | ONLY STRAIGHT INTO CAMERA VALID |
| MAIN SHOT: | ☐ | VALID |
| MINIMUM PHOTOGRAPH QUANTITY: | ☐ | PHOTOGRAPHS |

TARGET DATE AND TIME:

FROM ☐

TO ☐

ESTIMATED FINISH: ☐

[ SET ]   [ CANCEL ]

FIG.11

| ID | NAME | TARGET | PHOTOGRAPH QUANTITY | MAIN QUANTITY |
|---|---|---|---|---|
| 4 | KAZUKO KATO | ON | 0 | 0 |
| 5 | SABURO YAMAMOTO | ON | 1 | 0 |
| 2 | HANAKO TAKAHASHI | ON | 3 | 1 |
| 1 | TARO FUJI | ON | 5 | 2 |
| 3 | JIRO SUZUKI | OFF | 0 | 0 |

DISPLAY DETAILS  BACK

IMAGE CAPTURING APPARATUS, PHOTOGRAPH QUANTITY MANAGEMENT METHOD, AND PHOTOGRAPH QUANTITY MANAGEMENT PROGRAM

BACKGROUND OF THE INVENTION

1. Field of the Invention

The present invention relates to a technique for notifying a user a photograph quantity of a particular subject taken by an image capturing apparatus.

2. Description of the Related Art

Conventionally, techniques have existed which allow a user to know who is captured in a photographed image. For instance, a digital camera disclosed in Japanese Patent Application Laid-Open 2004-62868 comprises: a photosensor configured to capture images; an access device for accessing a face database used for storing names and face identification information related to individuals; a processor configured to evaluate loaded images to locate faces, and match the located faces to face identification information stored in the face database; and a communication device for communicating with a user, configured to request the name of a person when the face in an image does not match the face stored in the face database at the present moment.

SUMMARY OF THE INVENTION

With events such as school events, there is a need to be able to photograph each and every person to be photographed as subjects, such as students or children, in a uniform manner, or so that a certain photograph quantity will be taken for each subject. In this regard, the technique disclosed in Japanese Patent Application Laid-Open No. 2004-62868 merely requires that names are attached to faces which are detected a predefined number of times or more, and therefore is not useful towards equalizing the number of photographs taken.

The present invention has been made in consideration of the above problem, and its object is to prevent, as much as possible, bias among the number of photographs taken for subjects by managing the number of photographs taken for each subject.

In order to solve the above problem, an image capturing apparatus according to the present invention comprises: an image capturing element which receives subject light incident via a photographing lens, converts the subject light into a captured image signal, and outputs the signal; an A/D conversion section which converts the captured image signal outputted by the image capturing element into image data and outputs the image data; a storage section which stores at least the image data outputted by the A/D conversion section; a registration section which relates identification facial images which are image data to be used as criteria for identifying faces of subjects among the image data stored in the storage section to identification information of each object, and registers related data into a database; a facial image extraction section which extracts facial images which are facial portion regions of a person from photographed images which are desired image data outputted by the A/D conversion section and stored in the storage section; an identification section which identifies from the database an identification facial image matching an extracted facial image which is a facial image extracted by the facial image extraction section; and a photograph quantity calculation section which calculates for each subject identification information a photograph quantity which is the total number of photographed images from which an extracted facial image matching an identification facial image corresponding to identification information for each subject has been extracted.

In the image capturing apparatus according to the present invention, by registering in advance a facial image of each individual intended to be a subject, the number of photographed images from which facial images matching each facial image have been extracted is calculated. Displaying this photograph quantity with a LCD and the like, or notifying the photograph quantity through audio or the like, a user may easily learn how many photographs have been taken for which subject. Therefore, it becomes possible to prevent, as much as possible, occurrences of biases among the photograph quantities of subjects, such as cases where a desired photograph quantity is not taken for certain subjects or no photographs are taken for certain subjects.

A photograph quantity corresponding to the identification information of each subject is preferably displayed at a predefined timing. "Predefined timing" means before or after start of photographing, or more specifically, upon half-pressing or full-pressing a release switch, upon setting or deactivating settings of photographing modes, or upon transition to a predefined mode for confirming a photograph quantity.

The image capturing apparatus may further comprise a main subject determination section which determines which subject is a main subject based on photographed images and extracted facial images extracted from the photographed images.

Moreover, the photograph quantity calculation section may be arranged to calculate a main subject photograph quantity which is the total number of photographed images in which extracted facial images of a subject determined to be the main subject by the main subject determination section are extracted, while the display section may display the main subject photograph quantity at a predefined timing.

In other words, by limiting the displayed number of photographed images to only those for the main subject, the number of photographed images featuring the main subject can be learned in a convenient manner.

The image capturing apparatus may further comprise: a focus detection section which detects a focus position based on subject light; and a focus instruction section which accepts input operations for instructing a start of detection of the focus position by the focus detection section; wherein the focus detection section may detect the focus position in response to the focus instruction section accepting the input operation for instruction, and the display section may display a photograph quantity corresponding to the identification information of the subject determined to be the main subject by the main subject determination section upon detection of the focus position by the focus detection section.

At this point, the main subject determination section preferably determines a subject identified by an extracted facial image extracted from the vicinity of a focus position as the main subject. Alternatively, a subject may be determined to be a main subject when an extracted facial image exists at a predefined position within a photographed image, for instance near the center thereof.

Furthermore, displaying the photograph quantity for a main subject in focus upon detection of a focus position enables a photographer to grasp the photograph quantity for the subject at the precise moment of photographing that subject, and is useful in preventing biases among photograph quantities of subjects.

Preferably, the registration section relates individual information of a subject to identification information of that subject and registers the related information into a database, and the display section displays the individual information of a subject determined as being a main subject by the main subject determination section together with the photograph quantity thereof.

Specifically, individual information includes all information useful for identifying individuals, such as name, age, gender, affiliation and the like. Displaying such information upon detection of the focus position enables a photographer to grasp the identity of the subject at the precise moment of photographing that subject, and is useful in preventing biases among photograph quantities of subjects.

The image capturing apparatus further comprises a main subject determination setting section which accepts settings as to whether determination by the main subject determination section will be executed, and the main subject determination section performs determination on the main subject when the main subject determination setting section is set to execute determination.

In other words, whether the main subject determination section performs determination can be arbitrarily set by the main subject determination setting section.

The image capturing apparatus may further comprise a mode setting section which sets transition to a photograph quantity notification mode which notifies a photograph quantity, and the display section may be arranged to display the photograph quantity in response to a transition to a photograph quantity notification mode being set at the mode setting section.

The mode setting section is preferably composed of a switch, a touch panel or other operation devices.

The display section preferably displays a list of photograph quantities corresponding to the identification information of subjects according to a predefined sequence, such as in descending or ascending order of the photograph quantities. This allows a photographer to grasp at a glance which subject has many photographs and which subject has only a few.

The registration section preferably relates individual information of each subject to the identification information of the subject and registers the related information into the database.

Preferably, the image capturing apparatus further comprises an identification information selection section which accepts selection of identification information of a desired subject, and the display section displays at least one of an identification facial image and/or individual information corresponding to the identification information of a subject selected by the identification information selection section, and a photographed image from which an extracted facial image corresponding to the selected subject's identification information is extracted.

This enables detailed individual information of a desired subject to be verified together with the photograph quantity taken for the subject, and makes it possible to accurately grasp which subject has a biased photograph quantity or an excess/deficiency of in the photograph quantity thereof.

The image capturing apparatus further comprises a main subject determination section which determines, based on photographed images and an extracted facial image corresponding to the identification information of a selected subject, which photographed image features the subject as a main subject, and the display section displays the photographed image determined as to feature the subject as a main subject apart from the other photographed images.

This allows photographed images featuring the desired subject as a main subject to be distinguished at a glance from photographed images not featuring the subject as a main subject.

The image capturing apparatus may further comprise: a minimum photograph quantity setting section which sets a minimum photograph quantity prescribing a minimum photograph quantity for each subject so as to correspond to the identification information of each subject; and a notification section which issues warnings to the effect that a subject exists which corresponds to a photograph quantity not reaching the minimum photograph quantity.

The image capturing apparatus may further comprise a finish time setting section which sets an estimated time of finish of photographing for a subject, and the notification section may issue a warning before the time set by the finishing time setting section.

By issuing a warning to the effect that a subject exists for which a predefined photograph quantity has not yet been taken by the finish of photography, inconveniences caused by occurrences of events where such biases in the photograph quantities cannot be corrected afterwards may be prevented as much as possible.

The image capturing apparatus may further comprise: a focus detection section which detects a focus position based on subject light; and a focus instruction section which accepts input operations for instructing a start of detection of the focus position by the focus detection section; wherein the focus detection section may detect the focus position in response to the focus instruction section accepting the input operation for instruction, and the notification section may issue a warning upon detection of the focus position by the focus detection section.

Issuing a warning upon detection of the focus position enables a photographer to acknowledge that the photograph quantity for a particular subject has not yet reached a prescribed number at the precise moment of capturing that subject, and is useful in preventing biases among the photograph quantities of subjects.

The image capturing apparatus may further comprise a main subject determination section which determines which subject is a main subject based on photographed images and extracted facial images extracted from the photographed images, and the notification section issues a warning in response to the fact that the photograph quantity corresponding to an identification information of the subject determined by the main subject determination section to be a main subject has not reached a minimum photograph quantity.

Issuing a warning to the effect that the photograph quantity of a subject which is the main subject has not reached a minimum photograph quantity enables a photographer to grasp that the photograph quantity of a subject just about to be captured has not reached a minimum photograph quantity, and is useful in preventing biases among photograph quantities of subjects.

Preferably, the registration section relates individual information of each subject to the identification information of each subject and registers the related information into a database, and the notification section issues a warning by notifying individual information of a subject for which the photograph quantity has not reached a minimum photograph quantity.

This allows the photographer to obtain individual information on a subject for which the photograph quantity has not reached a predefined photograph quantity, and enables the photographer to accurately grasp which subject's photograph quantity is insufficient. This is particularly effective when there are many subjects.

The image capturing apparatus may further comprise an eye open/shut detection section which determines whether the eyes existing in an extracted facial image are opened or shut, and the photograph quantity calculation section preferably removes photographed images from which an inappropriate facial image, which is an extracted facial image with eyes determined to be shut by the eye open/shut detection section is extracted, from a calculation of a photograph quantity of photographed images for a photograph quantity corresponding to the inappropriate facial image.

Removing images in which the eyes are shut from the photograph quantity enables narrowing down the photographed images targeted for unbiasing to only appropriate images.

The image capturing apparatus may further comprise an eyes open/shut determination setting section which accepts setting whether determination by the eyes open/shut detection section is executed, wherein the eyes open/shut detection section may be arranged to determine whether eyes existing in an extracted facial image are open or shut when the eyes open/shut determination setting section has been set to execute determination.

In other words, whether determination by the eyes open/shut detection is performed can be arbitrarily set by the eyes open/shut determination setting section.

The image capturing apparatus may further comprise an face size determination section which determines whether an extracted facial image is a predefined size, wherein the photograph quantity calculation section preferably removes photographed images from which an inappropriate facial image, which is an extracted facial image determined not to be a predefined size by the face size determination section is extracted, from a calculation of a photograph quantity corresponding to the inappropriate facial image.

Removing photographed images which include extracted facial images that are under a predefined size enables narrowing down the photographed images targeted for unbiasing to only appropriate images.

The image capturing apparatus may further comprise face size determination setting section which accepts setting whether determination by the face size determination section is executed, wherein the face size determination setting section may be arranged to determine whether the size of an extracted facial image eyes is a predefined size when the face size determination setting section has been set to perform determination.

In other words, whether the face size determination section executes determination can be arbitrarily set by the face size determination setting section.

The photograph quantity calculation section preferably calculates a photograph quantity upon either recording or deletion of a photographed image, or registration or deletion of an identification facial image.

This allows the photograph quantities to be kept up to date in response to new storing or deletion of photographed images.

The image capturing apparatus may further comprise a range specification section which specifies a range of photographed images to be targeted by the face extraction section for facial image extraction, and the face extraction section extracts facial images from photographed images in the range specified by the range specification section.

The image capturing apparatus may further comprise an input section into which identification facial images are inputted from external electronic devices, and the storage section may store identification facial images inputted into the input section.

In other words, there is no need to limit image data to be used as identification facial images to just input data outputted from the A/D conversion section, and image data may be inputted from various electronic devices such as external servers or cameras.

The photograph quantity management method according to the present invention is a photograph quantity management method used in an image capturing apparatus comprising: an image capturing element which receives subject light incident via a photographing lens, converts the subject light into a captured image signal, and outputs the signal; an A/D conversion section which converts the captured image signal outputted by the image capturing element into image data and outputs the image data; a storage section which stores at least the image data outputted by the A/D conversion section; wherein the photograph quantity management method comprises: a registration step which relates identification facial images which are image data to be used as criteria for identifying faces of subjects among the image data stored in the storage section to identification information, and stores the related data into a database; an extraction step which extracts facial images which are facial portion regions of a person from photographed images which are desired image data outputted by the A/D conversion section and stored in the storage section; an identification step which identifies from the database an identification facial image matching an extracted facial image which is a facial image extracted by the facial image extraction section; and a calculation step which calculates for each subject identification information a photograph quantity which is the total number of photographed images from which an extracted facial image matching an identification facial image corresponding to identification information for each subject has been extracted.

The photograph quantity management program according to the present invention is a photograph quantity management program used in an image capturing apparatus comprising: an image capturing element which receives subject light incident via a photographing lens, converts the subject light into a captured image signal, and outputs the signal; an A/D conversion section which converts the captured image signal outputted by the image capturing element into image data and outputs the image data; a storage section which stores at least the image data outputted by the A/D conversion section; and a processing unit; wherein the photograph quantity management program causes the processing unit to execute the steps of:

a registration step which relates identification facial images which are image data to be used as criteria for identifying faces of subjects among the image data stored in the storage section to identification information, and registers the related data into a database;

an extraction step which extracts facial images which are facial portion regions of a person from photographed images which are desired image data outputted by the A/D conversion section and stored in the storage section;

an identification step which identifies from the database an identification facial image matching an extracted facial image which is a facial image extracted by the facial image extraction section;

and a calculation step which calculates for each subject identification information a photograph quantity which is the total number of photographed images from which an extracted facial image matching an identification facial image corresponding to identification information for each subject has been extracted.

Various circuits such as CPUs (central processing units) and ASICs may be used as the processing unit.

According to the present invention, by registering in advance a facial image of each individual intended to be a subject, a quantity of photographed images from which facial images matching each facial image have been extracted is calculated. By displaying the photograph quantity with a LCD and the like, or notifying the photograph quantity through audio or the like, a user may easily grasp how many photographs have been taken for which subject. Therefore, it becomes possible to prevent, as much as possible, occurrences of biases among the photograph quantities of subjects, such as in cases where a desired photograph quantity is not taken for certain subjects or no photographs are taken for certain subjects.

BRIEF DESCRIPTION OF THE DRAWINGS

FIG. 5 is an explanatory diagram of a concept of a basic information registration table;

FIG. 6 is an explanatory diagram of a concept of a photographed image list table;

FIG. 7 is an explanatory diagram of a concept of list table of a photograph quantity by subject;

FIG. 8 is a diagram showing an example of a condition setting screen;

FIG. 11 is a display example of list information;

DETAILED DESCRIPTION OF THE PREFERRED EMBODIMENTS

Preferred embodiments of the present invention will now be described with reference to the attached drawings.

Figure 1:
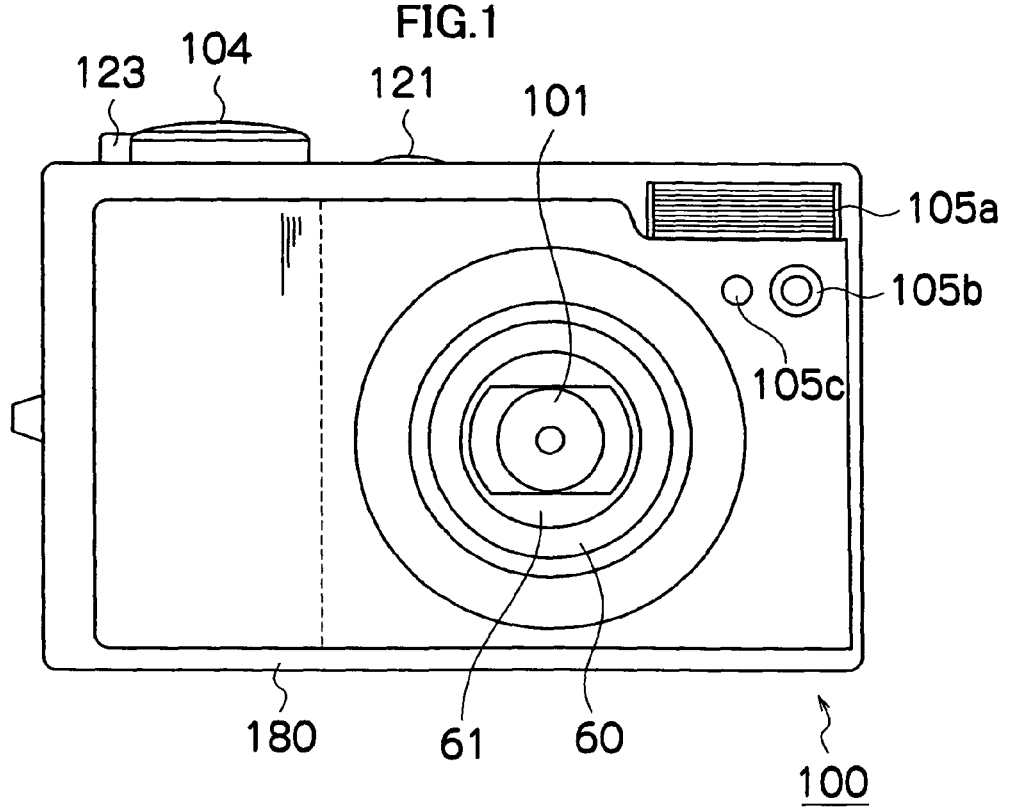
FIG. 1 is a front view of a digital camera.

FIG. 1 is a front view of a digital camera (hereinafter abbreviated as "camera") 100 according to a preferred embodiment of the present invention.

A photographing lens 101 which includes a zoom lens 101a and a focusing lens 101b is housed in a lens cone 60 deployed on a front face of the camera 100. Focal length adjustment is performed by moving the zoom lens 101a in the direction of an optical axis, while focus adjustment is performed by moving the focusing lens 101b in the direction of the optical axis.

From its retracted state in a camera body 180, the lens cone 60 extends out from and retracts back into the camera body 180 by moving back and forth between a wide end, which is a preset minimum focal length, and a tele end, which is a preset maximum focal length. The drawing shows the lens cone 60 retracted into the camera body 180.

The camera 100 is also provided with a lens cover 61 which covers the frontal face of the photographing lens 101 to create a protection state of the photographing lens 101 by secluding it from the outside during non-photographing mode, and exposes the photographing lens to the outside during photographing mode.

The lens cover 61 is configured with an openable and closable mechanism, and covers the frontal face of the photographing lens 101 in its opened state, while exposing the frontal face of the photographing lens 101 to the outside in its closed state. The lens cover 61 is opened/closed in conjunction with the turning on/off of a power switch 121. The drawing shows the lens cover 61 in its opened state.

A mode dial 123 provided with a release switch 104 at a central portion thereof and the power switch 121 are disposed on an upper face of the camera 100. A flash 105a, an AF fill light lamp 105b, a self-timer lamp 105c and the like are disposed on the frontal face of the camera 100.

Figure 2:
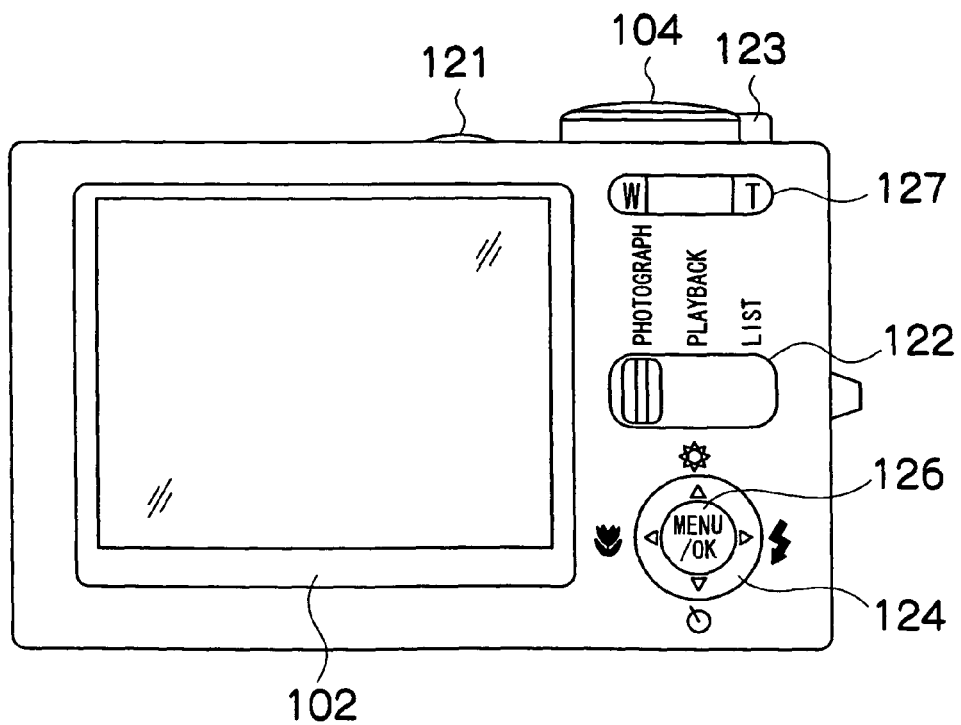
FIG. 2 is a rear view of a digital camera.

FIG. 2 is a rear view of the camera 100. A zoom switch 127 is disposed on the rear face of the camera 100. By pressing a wide (W) side of the zoom switch 127, the lens cone 60 moves towards a wide-end (wide angle) side as long as the switch is pressed down. By pressing the other tele (T) side of the zoom switch 127, the lens cone 60 extends out towards a tele-end (telephoto) side as long as the switch is pressed down.

An image displaying LCD 102, a switching lever 122, a cross-shaped key 124, an information position specifying key 126 and the like are also provided on the rear face of the camera 100. The cross-shaped key 124 is an operation system in which up, down, left and right respectively set display brightness adjustment/self-timer/macro photography/flash photography. Although a description will be provided later, pressing the down key of the cross-shaped key 124 enables setting of a self photographing mode, where a main CPU 20 causes a CCD 132 to perform shutter operations after conclusion of a clocking operation by a self-timer circuit 83.

Figure 3:
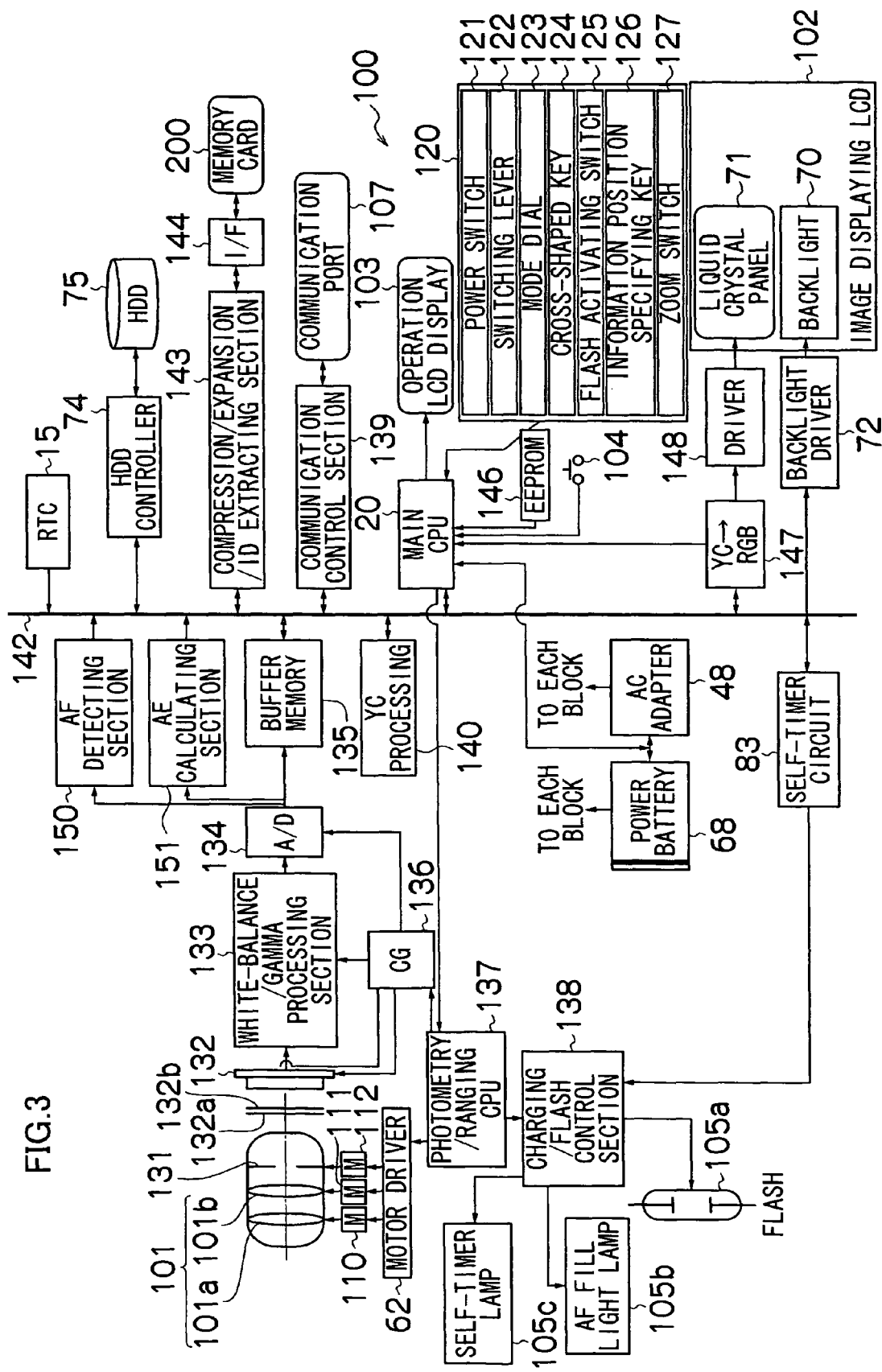
FIG. 3 is a block configuration diagram of a digital camera.

FIG. 3 is a block diagram of the camera 100. The camera 100 is provided with an operation section 120 which allows a user to perform various operations when using the camera 100. The operation section 120 comprises: the power switch 121 for turning on power to activate the camera 100; the switching lever 122 which allows arbitrary switching among photographing, playback, and list playback which will be described later; the mode dial 123 for selecting automatic photographing, manual photographing or the like; the cross-shaped key 124 for setting or selecting among various menus and for performing zoom; a flash activating switch 125; and the information position specifying key 126 for executing or canceling menus selected through the cross-shaped key 124.

The camera 100 also comprises: the image displaying LCD 102 for displaying photographed images, playback images or the like; and an operation LCD display 103 which provides assistance for operation.

The camera 100 is equipped with the release switch 104. Instructions to commence photographing are conveyed to the main CPU 20 by the release switch 104. In the camera 100, the switching lever 122 enables switching among photographing, playback, and the after-mentioned "list mode" to be performed arbitrarily. When photographing, the switching lever 122 is switched to its photographing side by the user. For playback, the switching lever 122 is switched to its playback side. For "list mode", the switching lever 122 is switched to its "list" side. In addition, the camera 100 is equipped with a flash activating device comprising a flash activation tube 105a which activates flashes.

The camera 100 also comprises the photographing lens 101, a diaphragm 131, and the CCD sensor 132 (hereinafter abbreviated to "CCD 132") which is an image capturing element that converts subject images formed via the photographing lens 101 and the diaphragm 131 into analog image signals. More specifically, the CCD 132 creates image signals by accumulating electric charges generated by subject light irradiating the CCD 132 over a variable electric charge accumulation period (exposure period). An image signal for each frame is sequentially outputted from the CCD 132 at timings synchronized with vertical synchronizing signals VD outputted from a CG section 136.

In the case the CCD 132 is used as the image capturing element, an optical low-pass filter 132a which removes unnecessary high frequency elements from incident light is provided to prevent occurrences of false color signals and moiré fringes or the like. Also provided is an infrared cut filter 132b which absorbs or reflects infrared light in the incident light to correct the unique sensitivity characteristic of the CCD 132 which is sensitive in the long wavelength range. Disposition of the optical low-pass filter 132a and the infrared cut filter 132b is not limited to any particular aspect.

The camera 100 also comprises a white-balance/gamma processing section 133 which adjusts the white balance of a subject image represented by the analog image signal from the CCD sensor 132, and adjusts the gradient (gamma) of a straight line in the tone characteristic of the subject image. The white-balance/gamma processing section 133 also includes an amplifier with variable amplification which amplifies the analog image signal.

The camera 100 further comprises an A/D conversion section 134 which performs A/D conversion on the analog signals from the white-balance/gamma processing section 133 to convert into digital RGB image data, and a buffer memory 135 for storing the RGB data from the A/D conversion section 134.

In the present embodiment, the A/D conversion section 134 has a quantization resolution of 8 bits, and converts analog RGB captured image signals outputted from the white-balance/gamma processing section 133 into RGB digital image data with levels of 0 to 255 and outputs the converted data. However, the described quantization resolution is merely an example, and is not a value essential to the present invention.

The camera 100 also comprises the CG (clock generator) section 136, a photometry/ranging CPU 137, a charging/flash control section 138, a communication control section 139, a YC processing section 140, and a power battery 68.

The CG section 136 outputs vertical synchronizing signals VD for driving the CCD sensor 132, drive signals including high-speed discharge pulses P, control signals which control the white-balance/gamma processing section 133 and the A/D conversion section 134, and control signals which control the communication control section 139. In addition, control signals from the photometry/ranging CPU 137 is inputted to the CG section 136.

The photometry/ranging CPU 137 performs ranging by controlling a zoom motor 110, a focusing motor 111 and an aperture motor 112 which performs aperture adjustment to respectively drive the zoom lens 101a, the focusing lens 101b and the diaphragm 131, and controls the CG section 136 and the charging/flash control section 138. Driving of the zoom motor 110, the focusing motor 111 and the aperture motor 112 is controlled by a motor driver 62, and control commands for the motor driver 62 are sent from either the photometry/ranging CPU 137 or the main CPU 20.

When the release switch 104 is half-pressed (S1 is activated), the photometry/ranging CPU 137 performs photometry (calculation of EV values) of the brightness of the subject based on image data periodically (every 1/60th to 1/30th of a second) obtained from the CCD 132.

In other words, an AE calculating section 151 integrates the RGB signals outputted from the A/D conversion section 134, and provides the photometry/ranging CPU 137 with an integrated value. The photometry/ranging CPU 137 detects an average brightness of the subject (subject luminance) based on the integrated value inputted from the AE calculating section 151, and calculates an exposure value (EV value) suitable for photographing.

Based on the obtained EV value, the photometry/ranging CPU 137 then determines an exposure value which includes an aperture value (F value) of the diaphragm 131 and an electronic shutter (shutter speed) of the CCD 132 according to a predetermined program chart (AE operation).

When the release button 104 is fully pressed (S2 is activated), the photometry/ranging CPU 137 drives the diaphragm 131 based on the determined aperture value to control the aperture size of the diaphragm 131, and controls the electric charge accumulation period at the CCD 132 via the CG section 136 based on the determined shutter speed.

AE operations include aperture priority AE, shutter speed priority AE, and program AE. In any case, by measuring subject luminance and performing photographing using the exposure value, or in other words, the combination of aperture value and shutter speed determined based on the photometric value of the subject luminance, the image capturing apparatus is controlled so that image capturing is performed under an appropriate exposure, thereby eliminating troublesome exposure determination.

An AF detecting section 150 extracts from the A/D conversion section 134 image data corresponding to a detection range selected by the photometry/ranging CPU 137. The method used for detecting focus position utilizes a characteristic where the high frequency components of image data reach maximum amplitude at a focus position. The AF detecting section 150 calculates an amplitude value by integrating over one field period the high frequency components of the extracted image data. The AF detecting section 150 sequentially calculates amplitude values while the photometry/ranging CPU 137 controls driving of the focusing motor 111 and moves the focusing lens 101a within its range of movement, i.e. between the end point of the infinity side (INF point) and the end point of the near side (NEAR point), and when maximum amplitude is detected, transmits the detected value to the photometry/ranging CPU 137.

The photometry/ranging CPU 137 obtains the detected value, and instructs the focusing motor 111 to move the focusing lens 101b to a focus position corresponding to the detected value. In response to the instruction from the photometry/ranging CPU 137, the focusing motor 111 moves the focusing lens 101b to a focus position (AF operation).

The photometry/ranging CPU 137 is connected to the release switch 104 through inter-CPU communication with the main CPU 20, and detection of the focus position is performed when the release switch 104 is half-pressed by the user. The zoom motor 110 is also connected to the photometry/ranging CPU 137. When the main CPU 20 receives instructions to zoom in either a tele direction or a wide direction from the user through the zoom switch 127, the photometry/ranging CPU 137 drives the zoom motor 110 to move the zoom lens 101a between the wide end and the tele end.

In order to activate the flash activating tube 105a, the charging/flash control section 138 receives power supplied from the power battery 68 to charge a flash activating condenser, not shown, and controls flashing of the flash activating tube 105a.

In response to the start of charging of the power battery 68, as well as the loading of various signals such as half-pressed operation signals and fully-pressed operation signals of the release switch 104 and signals indicating flash amount and flash timing from the main CPU 20 or the photometry/ranging CPU 137, the charging/flash control section 138 controls current supply to the self-timer lamp 105c or the AF fill light 105b to ensure that a desired flash amount is obtained at a desired timing.

More specifically, when a high (H) level signal is inputted to the charging/flash control section 138 from the main CPU 20 or the photometry/ranging CPU 137, the self-timer lamp 105c enters an energized state and turns on. On the other hand, when a low (L) level signal is inputted to the charging/flash control section 138, the self-timer lamp 105c enters a non-energized state and turns off.

The main CPU 20 or the photometry/ranging CPU 137 varies the luminance (brightness) of the self-timer lamp 105c by setting varying ratios of output periods of the H and L level signals (duty ratio).

The self-timer lamp 105c may be composed of an LED. Alternatively, the self-timer lamp 105c and the AF fill light lamp 105b may share the same LED.

The self-timer circuit 83 is connected to the main CPU 20. When the mode is set to self-photographing mode, the main CPU 20 performs clocking based on a fully-pressed signal of the release switch 104. During clocking, the main CPU 20 controls the self-timer lamp 105c via the photometry/ranging CPU 137 to blink so that its blinking progressively becomes faster according to the remaining time. Upon conclusion of clocking, the self-timer circuit 83 inputs a clocking conclusion signal to the main CPU 20. Based on the clocking conclusion signal, the main CPU 20 causes the CCD 132 to perform a shutter operation.

A communication port 107 is provided at the communication control section 139. The communication control section 139 is responsible for data communication with external devices, such as a personal computer with an USB terminal, by outputting image signals of a subject photographed by the camera 100 to such external devices and inputting image signals from such external devices to the camera 100. The camera 100 is also provided with a function which simulates the functions of conventional cameras that perform photography onto rolls of photographic film which enable such conventional cameras to switch among ISO sensitivities such as 100, 200, 400 and 1600. When ISO sensitivity is switched to 400 or higher, the camera 100 assumes a high sensitivity mode where the amplification factor of the amplifier of the white-balance/gamma processing section 133 is set to a high amplification factor which exceeds a predetermined amplification factor. During photographing under the high sensitivity mode, the communication control section 139 discontinues communication with external devices.

The camera 100 is also provided with a compression/expansion/ID extracting section 143 and an I/F section 144. The compression/expansion/ID extracting section 143 reads out image data stored in the buffer memory 135 via a bus line 142 and compresses the image data, and stores the image data into a memory card 200 via the I/F section 144. In addition, when reading out image data stored in the memory card 200, the compression/expansion/ID extracting section 143 extracts an identification number (ID) unique to the memory card 200, reads out image data stored in the memory card 200 and expands the image data, and stores the image data into the buffer memory 135.

Y/C signals stored in the buffer memory 135 are compressed by the compression/expansion/ID extracting section 143 into a predetermined format, and are then recorded to a removable media such as the memory card 200 or a built-in high-capacity storage media such as a hard disk (HDD) 75 via the I/F section 144 in a predetermined format (e.g. Exif (Exchangeable Image File Format) file). Recording of data to the hard disk (HDD) 75 or reading of data from the hard disk (HDD) 75 is controlled by a hard disk controller 74 in response to instructions from the main CPU 20.

The camera 100 is also provided with the main CPU 20, an EEPROM 146, a YC/RGB conversion section 147, and a display driver 148. The main CPU 20 provides overall control of the camera 100. Individual data and programs unique to the camera 100 are stored in the EEPROM 146. The YC/RGB conversion section 147 converts color image signals generated at the YC processing section 140 into trichromatic RGB signals, and outputs the converted signals to the image displaying LCD 102 via the display driver 148.

The camera 100 is configured so that an AC adapter 48 for obtaining power from an AC power source and the power battery 68 are both detachable. The power battery 68 is composed of a chargeable secondary battery such as a NiCD battery, a nickel hydride battery or a lithium-ion battery. The power battery 68 may also be composed of a disposable primary battery such as a lithium battery or an alkaline battery. By loading the power battery 68 into a battery storage compartment, not shown, the power battery 68 is electrically connected to the various circuits of the camera 100.

When the AC adapter 48 is loaded onto the camera 100 and power is supplied from an AC source to the camera 100 via the AC adapter 48, the power outputted from the AC adapter 48 is preferentially supplied to the various sections of the camera 100 as driving power even when the power battery 68 is loaded in the battery storage compartment. Meanwhile, when the AC adapter 48 is not loaded but the power battery 68 is, power outputted from the power battery 68 is supplied to the various sections of the camera 100 as driving power.

Incidentally, although not shown, the camera 100 is provided with a backup battery that is separate from the power battery 68 to be loaded into the battery storage compartment. For instance, a dedicated secondary battery is used for the internal backup battery, and is charged by the power battery 68. The backup battery supplies power to the basic functions of the camera 100 when the power battery 68 is not loaded into the battery storage compartment for replacement or removal.

In other words, when power supply from the power battery 68 or the AC adapter 48 is terminated, the backup batter is connected to a RTC 15 or the like by a switching circuit (not shown), and supplies power to these circuits. This ensures that power is supplied without interruption to basic functions such as the RTC 15 or the like unless the backup battery 29 reaches the end of its battery life.

The RTC (Real Time Clock) 15 is a dedicated chip for clocking, and remains in continuous operation by receiving power from the backup battery even when power supply from the power battery 68 or the AC adapter 48 has been cut off.

A backlight 70 which illuminates a transmissive or semi-transmissive liquid crystal panel 71 from its rear face-side is provided on the image display LCD 102. During power saving mode, the main CPU 20 controls the brightness (luminance) of the backlight 70 via a backlight driver 72, thereby reducing power consumed by the backlight 70. In addition, the power saving mode can be turned on and off by performing a predetermined operation on a menu screen which is displayed on the image display LCD 102 by pressing the information position specifying key 126 of the operation section 120.

Figure 4:
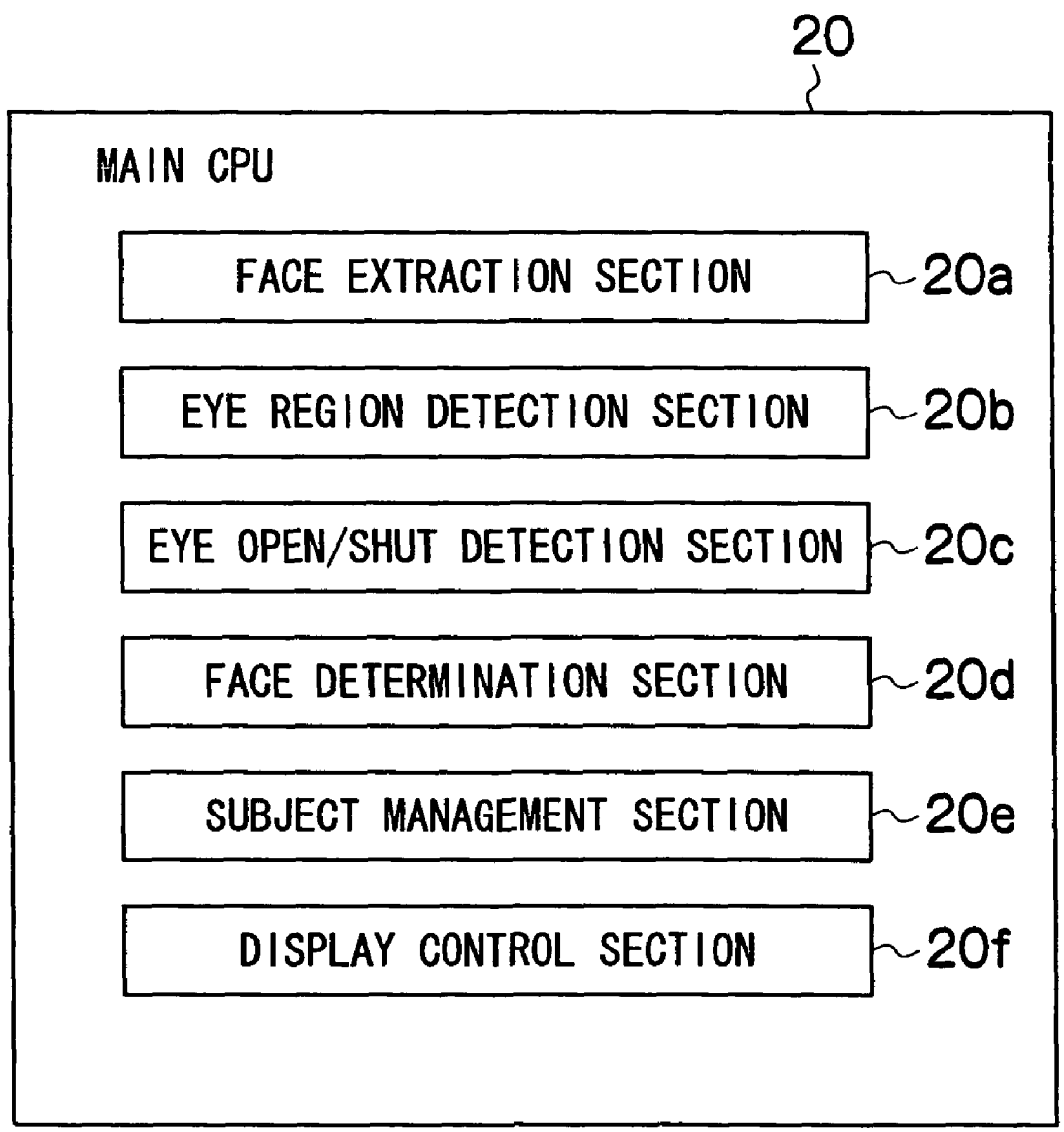
FIG. 4 is a diagram conceptually illustrating a program executed by a main CPU.

FIG. 4 is a diagram conceptually illustrating a program executed by the main CPU 20. The main CPU 20 reads out: a face extraction section 20a; an eye region detection section 20b; an eye open/shut detection section 20c; a face determination section 20d; an object management setting section 20e; and a display control section 20f; which are programs stored in a computer readable storage media such as the EEPROM 146 or the hard disk 75, to a volatile memory (RAM or the like) and executes the programs. These programs may also be referred to as simply "program".

The face extraction section 20a extracts facial regions, which are regions that include facial portions of individuals, from images stored in the HDD 75 or images that are sequentially stored in the buffer memory 135 (these images may be hereinafter referred to as "original images"). As for the method for extracting facial regions, for instance, a technique disclosed in Japanese Patent Application Laid-Open No. 09-101579 "Facial Region Extraction Method and Copying Condition Determination Method" by the present inventor may be applied.

This technique determines whether the hue of each pixel of a photographed image falls in a skin color range in order to divide the image into a skin-colored region and a non-skin-colored region, and detects edges in the image in order to classify each location in the image to either edge portions or non-edge portions. A region within a skin-colored region comprising pixels classified as non-edge portions and surrounded by pixels determined to be edge portions is extracted as a face candidate region. The extracted face candidate region is determined whether it corresponds to a face of a person, and is then extracted as a facial region based on the determination results. Alternatively, facial regions may be extracted using methods described in Japanese Patent Application Laid-Open No. 2003-209683 or Japanese Patent Application Laid-Open No. 2002-199221.

In the following description, images of facial regions extracted from original images by the face extraction portion 20a will be referred to as "extracted facial images".

The eye region detection section 20b detects eye regions in which eyes exist from facial regions extracted from the original images by the face extraction portion 20a. Eye regions may be detected from relative positional relationships at central locations of facial outlines which are obtained as result of face detection.

The eye open/shut detection section 20c determines whether eyes in an eye region are opened or shut, or whether they are completely opened or only half-opened. The method for determining whether eyes are open or shut is not limited to any particular method. For instance, the eye open/shut detection section 20c respectively detects numbers of black pixels in vertical directions in two eye regions which correspond to both eyes. Based on the numbers of black pixels in vertical directions in the two eye regions, determination is performed on whether both eyes are open or shut, or only halfway open.

The face determination section 20d identifies a registration facial image matching an extracted facial image extracted by the face extraction section 20a from a basic information registration table 75a in the HDD 75, herein after-mentioned, and identifies the subject ID corresponding to the identified registration facial image. Various facial recognition techniques may be used to determine matches between registration facial images and extracted facial images. For instance, matches may be determined based on face sizes, face contours, eye positions or the like.

FIGS. 5 to 7 show information stored on the hard disk 75. Referring now to FIG. 5, a basic information registration table 75a is stored in the hard disk 75. The basic information registration table 75a relates "registration facial images", which are images to be used as criteria for identifying the face of each individual subject, to "subject IDs", which are identification information assigned to each individual subject. The "registration facial images" and "subject IDs" are further related to "names" of individuals.

Registration facial images are acquired by a photographer using the digital camera 100 by individually photographing the face of each subject. Alternatively, registration facial images may be inputted to the HDD 75 from various electronic devices such as an external server or a camera via the communication port 107. The photographer photographs a subject at a size and clarity sufficient for identifying the face of the subject, and inputs the "name" of the subject through the operation section 120. The subject management section 20e attaches a unique subject ID through the operation section 120 to the facial image, and relates the facial image to the inputted name and stores the facial image in the basic information registration table 75a. Facial images stored in the basic information registration table 75a become registered facial images. Stored contents of the basic information registration table 75a may be displayed on the liquid crystal panel 71 by performing predefined menu operations. The stored contents may also be added, changed, deleted or updated.

Referring now to FIG. 6, a photographed image list table 75b is stored in the hard disk 75. In this table, photographed images which are images obtained by fully pressing the release switch 104; subject IDs identified from the images by the face determination section 20d (in other words, identification information of the subjects shown in the image); main subject IDs which are the subject IDs of main subjects in the images; "face size inappropriate subject IDs" which are subject ID for subjects photographed at a size inappropriate for viewing or printing; "eyes inappropriate (half-open) subject IDs" which are subject IDs for subjects with eyes shut or half-open; and "line of sight inappropriate subject IDs" which are subject IDs for subjects whose lines of sight are inappropriate, are related to each other and stored.

Determination of which subject's subject ID should be stored in the photographed image list table as a "main subject ID", a "face size inappropriate subject ID", an "eyes inappropriate (half-open) subject ID" or a "line of sight inappropriate subject ID" may be either performed through software processing executed by the CPU 20, or though arbitrary operation of the operation section 120 by the user.

For instance, the face determination section 20 determines whether an extracted facial image detected by the face extraction section 20a is under a predefined size (for example, an absolute threshold such as 100 by 100 pixels, or a relative threshold such as the area ratio of the extracted image to the original image) (face size determination). If the extracted facial image is under the predefined size, a subject ID corresponding to a registered facial image matching a facial image of the facial region is related to the image as a "face size inappropriate subject ID", and stored in the photographed image list table 75b.

Alternatively, the face determination section 20 stores a subject ID corresponding to a registered facial image matching a facial region in which the eyes are determined by the eyes open/shut detection section 20c to be shut and/or half-open as an eyes inappropriate (half-open) subject ID into the photographed image list table 75b.

In addition, the face determination section 20 displays a list of extracted facial images detected by the face extraction section 20a onto the image display LCD 102 to have the user select an extracted facial image where the line of sight is deviated, and stores a subject ID corresponding to a registered facial image matching the selected extracted facial image as a line of sight inappropriate subject ID into the photographed image list table 75b.

Alternatively, the face determination section 20 determines whether an extracted facial image is a main subject based on whether the extracted facial image was at a predefined position, such as the focus position of the AF detection section 150 or the vicinity of the center of the original image upon half-pressing of the release switch 104 (main subject determination). However, if there is only one extracted facial image, the extracted facial image is determined to be the main subject regardless of whether it is positioned at a predefined position. When an extracted facial image is determined to be the main subject, a subject ID corresponding to a registered facial image matching the extracted facial image is stored in the photographed image list table 75b as a main subject ID.

While the above-described face extraction section 20a, eye region detection section 20b, eye open/shut detection section 20c, face determination section 20d, subject management section 20e, and the display control section 20f are programs executed by the main CPU 20, a variation configured so that either a portion of or all of the above programs are implemented in a dedicated semiconductor integrated circuit (ASIC or Application Specific Integrated Circuit) is also possible. This variation is preferable, since it reduces the load on the main CPU 20.

Referring now to FIG. 7, a photograph quantity by subject list table 75c is stored in the hard disk 75. Among the images stored in the HDD 75, to all original images or desired original images specified via the operation section 120, the photograph quantity by subject list table 75c relates: "photograph quantities" which indicate the total number of original images containing an extracted facial image matching a registered facial image; "photograph targets" which are flags indicating whether an original image will be a target of face extraction by the face extraction section 20a; "main shot quantities" which are the total number of original images in which the extracted facial image is the main subject; and "subject IDs" and "names" corresponding to registered facial images matching the extracted facial images.

Counting of the photograph quantity for each subject is performed by the subject management section 20e by individually adding up the number of extracted facial images, among those extracted from the original image by the face extraction section 20a, which match a certain registered facial image for each registered image. In addition, counting of the main shot quantity for each subject is performed by the subject management section 20e by individually adding up the number of extracted facial images positioned at the focus position of the AF detection section 150 or the vicinity of the center of the original image during photography for each registered image matching the extracted facial images.

While a description will be provided later, the subject management section 20e may also be arranged to exclude original images which include extracted facial images corresponding to subject IDs stored as "face size inappropriate subject IDs", "eyes inappropriate (half-open) subject IDs" or "line of sight inappropriate subject IDs" from the aggregate total of the photograph quantities.

The tables shown in FIGS. 5 to 7 do not necessarily have to be stored in the HDD 75. For instance, the tables may be stored in the memory card 200, or a server, not shown, connected via the communication port 107.

Operating conditions of the programs executed by the main CPU 20 may be arbitrarily set by selecting/specifying setting items of a graphical user interface (GUI) displayed on the liquid crystal panel 71 through the operation section 120.

FIG. 8 shows a condition setting screen which is an example of the GUI. Items settable by the condition setting screen are: a "face size" which is a relative area ratio threshold used for face size determination of an extracted facial image to an original image; whether facial images with eyes half-open will be considered valid/invalid as extracted facial images; whether only extracted facial images with subjects looking straight into the camera will be calculated for photograph quantities and main shot quantities; whether only extracted facial images in which their subjects are main subjects will be calculated for main shot quantities; a "minimum photograph quantity" which is a prescribed photograph quantity; an original image range which the face extraction section 20a targets for extracting facial regions (in this example, "from (start)" and "to (end)" of time and date of photography; and an estimated time of finish of photography of a subject.

The relationships between the setting items of the condition setting screen and the operation conditions of the programs are as follows. The face determination section 20d references an area ratio threshold set so as to correspond to a subject ID to determine whether the relative area ratio of a registered facial image corresponding to that subject ID to its original image exceeds the threshold. If not, the subject ID is stored as a "face size inappropriate subject ID".

Additionally, if "half-open invalid" is checked for a subject ID, in addition to an extracted facial image in which the eyes are completely shut, the eyes open/shut detection section 20c also stores an extracted facial image in which the eyes are neither completely shut nor completely open (so-called half-open) as an "eyes inappropriate (half-open) subject ID".

Moreover, the subject management section 20e calculates an aggregate total of "main shot IDs" only when "main shot" is checked for a subject ID.

If a "minimum photography quantity" of 1 or above is set for a subject ID, the subject management section 20e references the "photograph quantity" corresponding to that subject ID at a predefined timing (for instance, the time set as "estimated finish", or after a lapse of a predefined time, such as 15 minutes, after setting to photography mode). If the "photograph quantity" is under the "minimum photography quantity", a predefined warning is displayed on the liquid crystal 71. Alternatively, a warning message indicating the name of a subject for which the "photograph quantity" is under the "minimum photography quantity" may be played back through a speaker, not shown. This allows the photographer to easily acknowledge which subject's photograph quantity has not reached a prescribed quantity without having to go through the trouble of visually confirming the photograph quantity.

Furthermore, if "from" and "to" have been set, the face extraction section 20a performs face extraction only on original images with image recording dates/times recorded in datetimeoriginal tags or the like which are within the range defined by "from" and "to". This allows a photographer to arbitrarily specify at what timing images should be photographed to become targets of facial extraction, and is therefore preferable.

These setting items are individually settable for each subject ID, and set items are only valid for registered facial images corresponding to each subject ID.

Conditions set with this screen are related to subject IDs and stored in the EEPROM 146 or the like, and will become the conditions to which the main CPU 20 conforms when executing the various programs.

Figure 9:
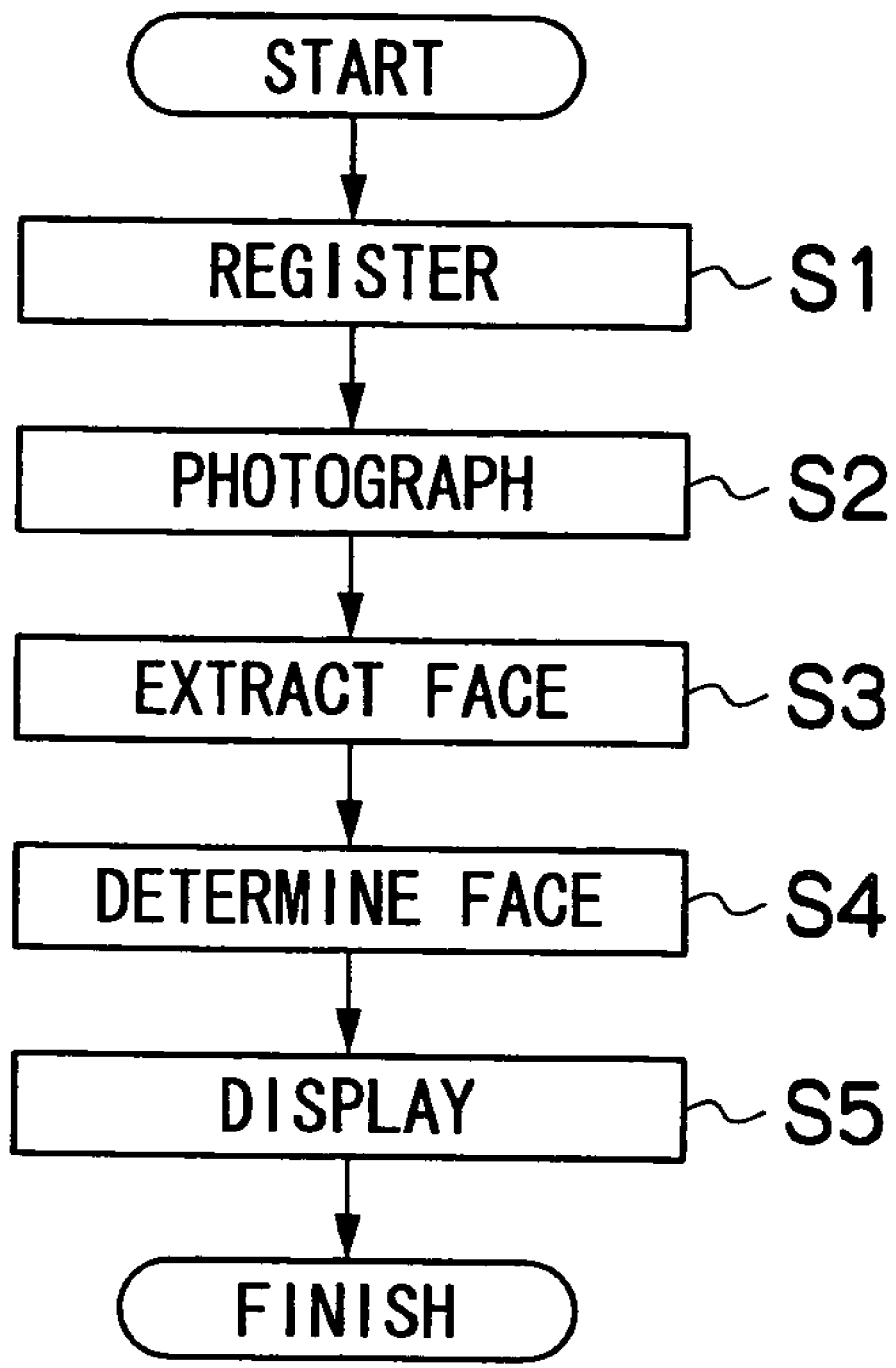
FIG. 9 is a diagram showing a flow of photograph quantity management processing.

A flow of photograph quantity management processing performed by the camera 100 will now be described with reference to the flowchart of FIG. 9.

First, in step S1, a photographer who intends to photograph one or a plurality of subjects specified in advance sets the switching lever 122 to "photograph", and individually photographs the face of each subject. For this purpose, it is preferable that the faces are photographed at clear and appropriate sizes to allow detection of the facial regions by the face detection section 20a. Each photographed facial image is displayed on the liquid crystal panel 71. The subject management section 20e accepts input of "names" of subjects through the graphical user interface (GUI), not shown, displayed on the liquid crystal panel 71.

Next, after confirming whether a photographed facial image should be registered in the basic information registration table 75a, when a designation for registration is forwarded from the operation section 120, the subject management section 20e attaches a unique subject ID to the photographed facial image, relates the name, facial image and the subject ID inputted through the operation section 120 to each other, and stores the related information into the basic information registration table 75a.

Facial images to be stored in the basic information registration table 75a by the subject management section 20e do not necessarily have to be images obtained based on image capturing signals of the CCD 132. As long as facial images are photographed at an appropriate size and with appropriate clarity, facial images may be, for instance, received from an external server via the communication port 107 or read out from the memory card 200. Start/finish of operation of the GUI for registering facial images may be switched back and forth by operating the operation section 120 during the photography mode.

In step S2, photography is performed independently of facial image registration in a state where the facial image registration GUI is disabled in photography mode. An original image obtained through photography is stored in the memory card 200 or the HDD 75. Accordingly, the subject management section 20e adds the file name of the newly obtained photographed image to the photographed image list table 75b.

In step S3, the face extraction section 20a extracts a facial region (in other words, an extracted facial image) from the photographed image.

In step S4, the face determination section 20d identifies a registered facial image which matches each extracted facial image from the basic information registration table 75a. Furthermore, the face determination section 20d also identifies a subject ID corresponding to the identified registered facial image. The face determination section 20d relates the identified subject ID to the file name of the original image, and adds the subject ID to the "subject ID" in the photographed image list table 75b. In other words, whenever photography is performed, identification information of the subject in the photographed image is stored into the photographed image list table 75b.

On the other hand, the "photograph quantity" of the photograph quantity by subject list table 75c, which is the total number of photographed images for which subject IDs were identified by the facial determination section 20d, is updated for each subject ID. In other words, whenever photography is performed, the total number of each subject appearing in the images photographed thus far is stored into the photograph quantity by subject list table 75c.

In addition, if the face extraction section 20a is able to extract an extracted facial image from the photographed image, eye region detection by the eye region detection section 20b, determination of whether eyes are shut or half-open by the eyes open/shut detection section 20c, face size determination and main subject determination by the face determination section 20d are also performed. Upon conclusion of the above determinations, according to the results thereof, a "main subject ID", a "face size inappropriate subject ID", an "eyes inappropriate (half-open) subject ID" or a "line of sight inappropriate subject ID" is stored into the photographed image list table 75b.

At the photograph quantity by subject list table 75c, for subject IDs for which "photography target" flags have been set to "off", updating of the corresponding "photograph quantities" or storing of "main subject IDs", "face size inappropriate subject IDs", "eyes inappropriate (half-open) subject IDs" or "line of sight inappropriate subject IDs" are not performed.

In addition, since it is conceivable that registered facial images may be added, deleted, changed or otherwise modified before or after recording of a photographed image, re-execution of the processing of step S4 may be arranged to be instructed at an arbitrary timing so that the processing is executed upon receiving such instructions for re-execution. Alternatively, the processing of step S4 may be arranged to be immediately executed upon addition or deletion of an original image. This enables variations in original images to be reflected to the stored contents of each table in a timely basis, and is therefore preferable.

In step S5, the user concludes the photographing sequence, and switches the switching lever 122 to "list". In response to the switching lever being switched to "list", the display control section 20f displays a "camera mode selection screen" on the liquid crystal panel 71.

Figure 10:
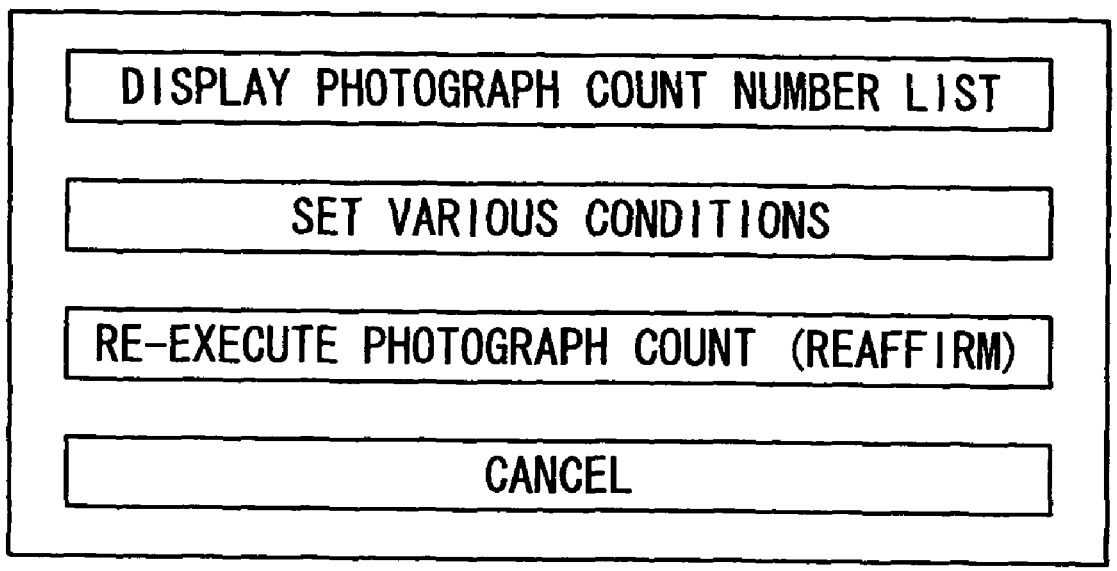
FIG. 10 is a display example of a camera mode selection screen.

FIG. 10 shows an example of a camera mode selection screen. In this camera mode selection screen, buttons for specifying four types of operations, namely "display photograph count list", "set various conditions", "re-execute photograph count" and "cancel", are displayed. Each menu may be selected/specified using the cross-shape key 124 or the like in the operation section to execute operations corresponding to each selected mode.

"Re-execute photograph count" is a button used to give the re-execution instruction of step S4. The processing of step S4 is executed upon operation of this button.

When "display photograph count list" is selected, the display control section 20f displays information stored in the photograph quantity by subject list table 75c on the liquid crystal panel 71.

FIG. 11 is an example of a list display of the contents of the photograph quantity by subject list table 75c. As shown in FIG. 11, list information composed of a subject ID, name, photograph target flag, photograph quantity, and number of main subjects related to each other in the photograph quantity by subject list table 75c is displayed in list format on the liquid crystal panel 71. At this point, the list information may be displayed after sorting in ascending/descending order of photograph quantity per subject. This allows a photographer to easily acknowledge which subject has had fewer or more photographs taken than others, and is useful in preventing or correcting occurrences of biases among the photograph quantity to be subsequently taken for the subjects.

Arbitrary list information can also be specified on this screen through the operation section 120. By specifying a list information and selecting the "display details" button, the display control section 20f displays detailed individual information on a corresponding subject.

Figure 12:
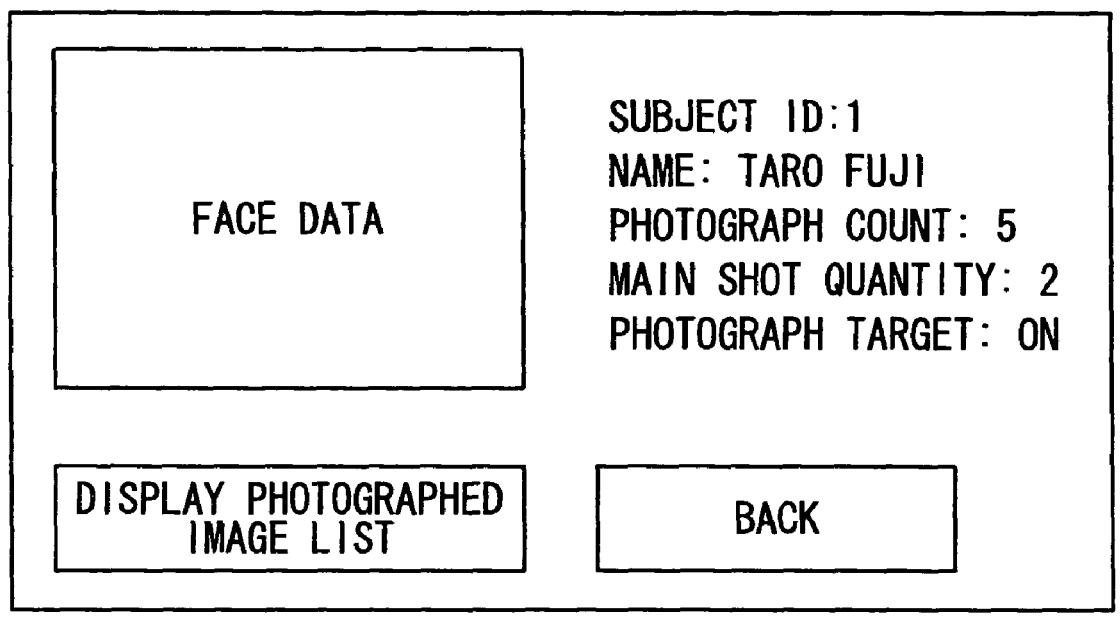
FIG. 12 is a display example of individual information.

FIG. 12 shows a display example of individual information. For instance, in addition to specified list information (subject ID, name, photograph quantity, main shot quantity, photograph target flag), a registered facial image is displayed on this screen. A photographer may reference this screen and confirm which subject has had fewer or more photographs taken than others while looking at the faces or names of the subjects.

Information to be displayed on this screen need not be displayed when the "list" mode is set by the switching lever 122. For instance, when the release switch is half-pressed, face extraction may be performed for a main subject who is in focus, and the photograph quantity, the name, the main shot quantity, as well as the minimum photograph quantity set through the condition setting screen described later or the like related to the subject ID corresponding to the extracted facial image may be displayed. In addition, when the release switch is half-pressed, a warning may be displayed or an audio warning message may be played back if the photograph quantity of a subject ID corresponding to an extracted facial image has not reached the minimum photograph quantity corresponding to that subject ID.

A "photographed image list display" button is provided on this screen. When the "photographed image list display" button is selected, the display control section 20f displays a list of photographed images corresponding to the subject ID of the specified list information.

A "delete" button which deletes specified list information when operated may also be provided on this screen.

Figure 13:
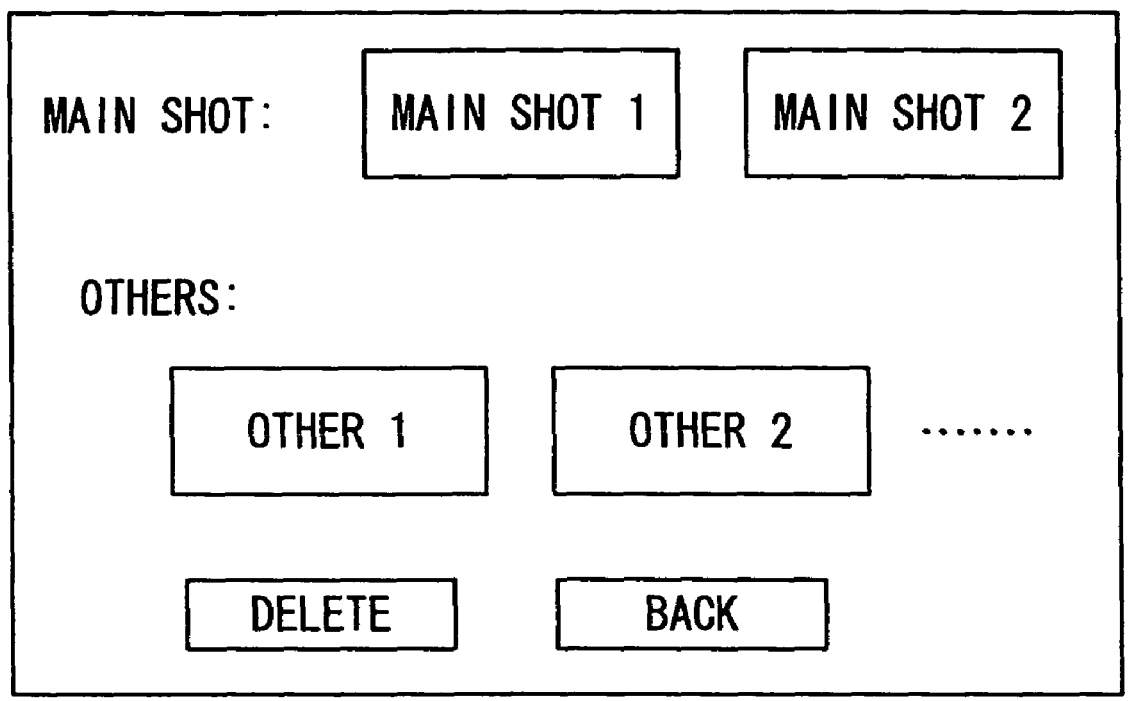
FIG. 13 is a list display example of photographed images.

FIG. 13 shows a list display example of photographed images. In the particular example shown in FIG. 13, the display control section 20f displays photographed images which correspond to a subject ID stored in the photographed image list table 75b as a "main subject ID" among the subject IDs of the specified list information as "main shots", and displays such "main shots" to be distinguishable from other photographed images. This allows photographed images showing the specified desired subject as a main subject to be displayed separately from the other photographed images, and enables a photographer to grasp at a glance which subject is featured as a main subject in which photographed image.

Photographed images may be deleted and organized on this screen. In other words, by selecting a desired photographed image and operating a "delete" button at the top of the screen, the selected photographed image is deleted from the HDD 75 or the like.

When "setting various conditions" is selected on the camera mode selection screen, a condition setting screen (refer to FIG. 8) for setting determination of eyes shut/half-open, determination of face size, and various other conditions for narrowing down the images to be displayed on the photographed image list is displayed.

While the camera 100 is suitable in a wide variety of applications, as an example, assume that a kindergarten field trip is taking place, and the teacher leading the children is acting as a photographer and is about to take photographs of the children. If a conventional camera was used to photograph the children during the field trip, verifying which child is captured in which photographed image, after the field trip is over, may reveal that the number of photographed children is biased. However, since the field trip is over, there is no way to correct the bias. In addition, if there are a significant number of children in the first place, the task itself of verifying which child ended up with more or fewer photographs than others is likely to be difficult.

In light of the above, the camera 100 according to the present invention should be used as follows. The faces, names and other individual information of the children are registered in advance into the camera 100, and a condition for each child is set on the condition setting screen. The teacher need not register all the children, and should register only those in his or her charge. Moreover, by storing in advance the individual information of all children as shared data in an external device such as a server, not shown, each teacher may download information via the communication port 107 to their respective cameras 100, thereby saving the trouble of individually registering information for each camera 100.

When a photographic opportunity arrives during the field trip, the photographer half-presses the release switch 104. At this point, the current photograph quantity or name of the child in focus is displayed on the liquid crystal display 71. The photographer is able to verify the photograph quantity of each child whenever photographing is performed. This allows the photographer to select another child as a subject if there is a large photograph quantity, while the release switch may be fully pressed is there is only a small photograph quantity, thereby ensuring that all children are evenly photographed.

Alternatively, if it is too onerous to verify the photograph quantity every time photographing is performed, the photographer may select the "list" mode using the lever 122 after taking a certain photograph quantity. In this case, since list information of the children is displayed on the liquid crystal panel 71, the photograph quantity and the like of a desired child will be displayed by selecting the list information of the child. By verifying individual photograph quantities of the children, the photographer may subsequently perform photographing either with attention given to avoid biases among the photograph quantities of the children, or in order to correct an existing bias.

Unlike conventional cases, continuing photography by iterating such operations as described above makes it possible to prevent, as much as possible, biases among the photography contents of the subjects.

What is claimed is:

1. An image capturing apparatus comprising:
   an image capturing element which receives subject light incident via a photographing lens, converts the subject light into a captured image signal, and outputs the signal;
   an A/D conversion section which converts the captured image signal outputted by the image capturing element into image data and outputs the image data;
   a storage section which stores at least the image data outputted by the A/D conversion section;
   a registration section which relates identification facial images which are image data to be used as criteria for identifying faces of subjects among the image data stored in the storage section to identification information of each subject, and registers related data into a database;
   a facial image extraction section which extracts facial images which are facial portion regions of a person from photographed images which are desired image data outputted by the A/D conversion section and stored in the storage section;
   an identification section which identifies from the database an identification facial image matching an extracted facial image which is a facial image extracted by the facial image extraction section;
   a photograph quantity calculation section which calculates for each subject identification information a photograph quantity which is the total number of photographed images from which an extracted facial image matching an identification facial image corresponding to identification information for each subject has been extracted;
   a display section which displays at a predefined timing a photograph quantity corresponding to the identification information of each subject;
   and a mode setting section which sets transition to a photograph quantity notification mode which notifies a photograph quantity, wherein
   the display section displays the photograph quantity in response to a transition to the photograph quantity notification mode being set at the mode setting section, wherein the display section displays in a predefined order photograph quantities corresponding to the identification information of each subject.

2. The image capturing apparatus according to claim 1, wherein the registration section relates individual information of each subject to the identification information of the subject and registers related information into the database.

3. The image capturing apparatus according to claim 2, further comprising: an identification information selection section which accepts selection of identification information of a desired subject, wherein
the display section displays at least one of an identification facial image and/or individual information corresponding to the identification information of a subject selected by the identification information selection section, and a photographed image from which an extracted facial image corresponding to the selected subject's identification information is extracted.

4. The image capturing apparatus according to claim 3, further comprising: a main subject determination section which determines, based on the photographed images and an extracted facial image corresponding to the identification information of the selected subject, which photographed image features the subject as a main subject, wherein
the display section displays a photographed image determined as to feature the subject as a main subject apart from the other photographed images.

5. An image capturing apparatus comprising:
an image capturing element which receives subject light incident via a photographing lens, converts the subject light into a captured image signal, and outputs the signal;
an A/D conversion section which converts the captured image signal outputted by the image capturing element into image data and outputs the image data;
a storage section which stores at least the image data outputted by the A/D conversion section;
a registration section which relates identification facial images which are image data to be used as criteria for identifying faces of subjects among the image data stored in the storage section to identification information of each subject, and registers related data into a database;
a facial image extraction section which extracts facial images which are facial portion regions of a person from photographed images which are desired image data outputted by the A/D conversion section and stored in the storage section;
an identification section which identifies from the database an identification facial image matching an extracted facial image which is a facial image extracted by the facial image extraction section;
a photograph quantity calculation section which calculates for each subject identification information a photograph quantity which is the total number of photographed images from which an extracted facial image matching an identification facial image corresponding to identification information for each subject has been extracted;
a display section which displays at a predefined timing a photograph quantity corresponding to the identification information of each subject;
a main subject determination section which determines which subject is a main subject based on the photographed images and extracted facial images extracted from the photographed images;
a focus detection section which detects a focus position based on subject light;
and a focus instruction section which accepts input operations for instructing a start of detection of the focus position by the focus detection section; wherein
the focus detection section detects the focus position in response to the focus instruction section accepting the input operation for instruction,
and the display section displays the photograph quantity corresponding to the identification information of a subject determined to be the main subject by the main subject determination section upon detection of the focus position by the focus detection section.

6. The image capturing apparatus according to claim 5, wherein the main subject determination section determines a subject identified by an extracted facial image extracted from the vicinity of the focus position as the main subject.

7. An image capturing apparatus comprising:
an image capturing element which receives subject light incident via a photographing lens, converts the subject light into a captured image signal, and outputs the signal;
an A/D conversion section which converts the captured image signal outputted by the image capturing element into image data and outputs the image data;
a storage section which stores at least the image data outputted by the A/D conversion section;
a registration section which relates identification facial images which are image data to be used as criteria for identifying faces of subjects among the image data stored in the storage section to identification information of each subject, and registers related data into a database;
a facial image extraction section which extracts facial images which are facial portion regions of a person from photographed images which are desired image data outputted by the A/D conversion section and stored in the storage section;
an identification section which identifies from the database an identification facial image matching an extracted facial image which is a facial image extracted by the facial image extraction section;
a photograph quantity calculation section which calculates for each subject identification information a photograph quantity which is the total number of photographed images from which an extracted facial image matching an identification facial image corresponding to identification information for each subject has been extracted;
a display section which displays at a predefined timing a photograph quantity corresponding to the identification information of each subject;
and a main subject determination section which determines which subject is a main subject based on the photographed images and extracted facial images extracted from the photographed images;
wherein the registration section relates individual information of the subject to identification information of the subject and registers related information into the database,
and the display section displays the individual information of a subject determined as being the main subject by the main subject determination section together with the photograph quantity.

8. An image capturing apparatus comprising:
an image capturing element which receives subject light incident via a photographing lens, converts the subject light into a captured image signal, and outputs the signal;
an A/D conversion section which converts the captured image signal outputted by the image capturing element into image data and outputs the image data;
a storage section which stores at least the image data outputted by the A/D conversion section;
a registration section which relates identification facial images which are image data to be used as criteria for identifying faces of subjects among the image data stored in the storage section to identification information of each subject, and registers related data into a database;

a facial image extraction section which extracts facial images which are facial portion regions of a person from photographed images which are desired image data outputted by the A/D conversion section and stored in the storage section;

an identification section which identifies from the database an identification facial image matching an extracted facial image which is a facial image extracted by the facial image extraction section;

a photograph quantity calculation section which calculates for each subject identification information a photograph quantity which is the total number of photographed images from which an extracted facial image matching an identification facial image corresponding to identification information for each subject has been extracted;

a minimum photograph quantity setting section which sets a minimum photograph quantity prescribing a minimum photograph quantity for each subject so as to correspond to the identification information of each subject;

a notification section which issues a warning to the effect that a subject exists which corresponds to a photograph quantity not reaching the minimum photograph quantity;

and a main subject determination section which determines which subject is a main subject based on the photographed images and extracted facial images extracted from the photographed images; wherein the notification section issues the warning in response to the fact that the photograph quantity corresponding to an identification information of the subject determined by the main subject determination section to be the main subject has not reached the minimum photograph quantity.

9. An image capturing apparatus comprising:

an image capturing element which receives subject light incident via a photographing lens, converts the subject light into a captured image signal, and outputs the signal;

an A/D conversion section which converts the captured image signal outputted by the image capturing element into image data and outputs the image data;

a storage section which stores at least the image data outputted by the A/D conversion section;

a registration section which relates identification facial images which are image data to be used as criteria for identifying faces of subjects among the image data stored in the storage section to identification information of each subject, and registers related data into a database;

a facial image extraction section which extracts facial images which are facial portion regions of a person from photographed images which are desired image data outputted by the A/D conversion section and stored in the storage section;

an identification section which identifies from the database an identification facial image matching an extracted facial image which is a facial image extracted by the facial image extraction section;

a photograph quantity calculation section which calculates for each subject identification information a photograph quantity which is the total number of photographed images from which an extracted facial image matching an identification facial image corresponding to identification information for each subject has been extracted;

a minimum photograph quantity setting section which sets a minimum photograph quantity prescribing a minimum photograph quantity for each subject so as to correspond to the identification information of each subject;

and a notification section which issues a warning to the effect that a subject exists which corresponds to a photograph quantity not reaching the minimum photograph quantity;

wherein the registration section relates individual information of each subject to the identification information of each subject and registers related information into the database, and the notification section issues the warning by notifying individual information of a subject for which the photograph quantity has not reached a minimum photograph quantity.

10. An image capturing apparatus comprising:

an image capturing element which receives subject light incident via a photographing lens, converts the subject light into a captured image signal, and outputs the signal;

an A/D conversion section which converts the captured image signal outputted by the image capturing element into image data and outputs the image data;

a storage section which stores at least the image data outputted by the A/D conversion section;

a registration section which relates identification facial images which are image data to be used as criteria for identifying faces of subjects among the image data stored in the storage section to identification information of each subject, and registers related data into a database;

a facial image extraction section which extracts facial images which are facial portion regions of a person from photographed images which are desired image data outputted by the A/D conversion section and stored in the storage section;

an identification section which identifies from the database an identification facial image matching an extracted facial image which is a facial image extracted by the facial image extraction section;

a photograph quantity calculation section which calculates for each subject identification information a photograph quantity which is the total number of photographed images from which an extracted facial image matching an identification facial image corresponding to identification information for each subject has been extracted;

and an eye open/shut detection section which determines whether the eyes existing in an extracted facial image are opened or shut, wherein the photograph quantity calculation section preferably removes photographed images from which an inappropriate facial image, which is an extracted facial image with eyes determined to be shut by the eye open/shut detection section is extracted, from a calculation of a photograph quantity of photographed images for a photograph quantity corresponding to the inappropriate facial image.

11. The image capturing apparatus according to claim 10, further comprising: an eyes open/shut determination setting section which accepts setting whether determination by the eyes open/shut detection section is executed, wherein the eyes open/shut detection section determines whether eyes existing in an extracted facial image are open or shut when the eyes open/shut determination setting section has been set to execute the determination.

12. The image capturing apparatus according to claim 10, wherein the photograph quantity calculation section calculates a photograph quantity upon either recording or deletion of the photographed images, or registration or deletion of the identification facial images.

13. The image capturing apparatus according to claim 10, further comprising: a range specification section which specifies a range of photographed images to be targeted by the face extraction section for facial image extraction, wherein
the face extraction section extracts the facial images from photographed images in the range specified by the range specification section.

14. The image capturing apparatus according to claim 10, further comprising: an input section into which identification facial images are inputted from external electronic devices, wherein
the storage section stores identification facial images inputted into the input section.

15. An image capturing apparatus comprising:
an image capturing element which receives subject light incident via a photographing lens, converts the subject light into a captured image signal, and outputs the signal;
an A/D conversion section which converts the captured image signal outputted by the image capturing element into image data and outputs the image data;
a storage section which stores at least the image data outputted by the A/D conversion section;
a registration section which relates identification facial images which are image data to be used as criteria for identifying faces of subjects among the image data stored in the storage section to identification information of each subject, and registers related data into a database;
a facial image extraction section which extracts facial images which are facial portion regions of a person from photographed images which are desired image data outputted by the A/D conversion section and stored in the storage section;
an identification section which identifies from the database an identification facial image matching an extracted facial image which is a facial image extracted by the facial image extraction section;
a photograph quantity calculation section which calculates for each subject identification information a photograph quantity which is the total number of photographed images from which an extracted facial image matching an identification facial image corresponding to identification information for each subject has been extracted;
and a face size determination section which determines whether the extracted facial image is a predefined size, wherein
the photograph quantity calculation section removes photographed images from which an inappropriate facial image, which is an extracted facial image determined not to be the predefined size by the face size determination section is extracted, from a calculation of a photograph quantity corresponding to the inappropriate facial image.

16. The image capturing apparatus according to claim 15, further comprising: a face size determination setting section which accepts setting whether determination by the face size determination section is executed, wherein
the face size determination setting section determines whether the size of an extracted facial image eyes is a predefined size when the face size determination setting section has been set to perform the determination.

17. The image capturing apparatus according to claim 15, wherein the photograph quantity calculation section calculates a photograph quantity upon either recording or deletion of the photographed images, or registration or deletion of the identification facial images.

18. The image capturing apparatus according to claim 15, further comprising: a range specification section which specifies a range of photographed images to be targeted by the face extraction section for facial image extraction, wherein
the face extraction section extracts the facial images from photographed images in the range specified by the range specification section.

19. The image capturing apparatus according to claim 15, further comprising: an input section into which identification facial images are inputted from external electronic devices, wherein
the storage section stores identification facial images inputted into the input section.

* * * * *